J. W. BASSHAM.
INNER TUBE.
APPLICATION FILED JUNE 20, 1918.
1,312,072.
Patented Aug. 5, 1919.
2 SHEETS—SHEET 1.
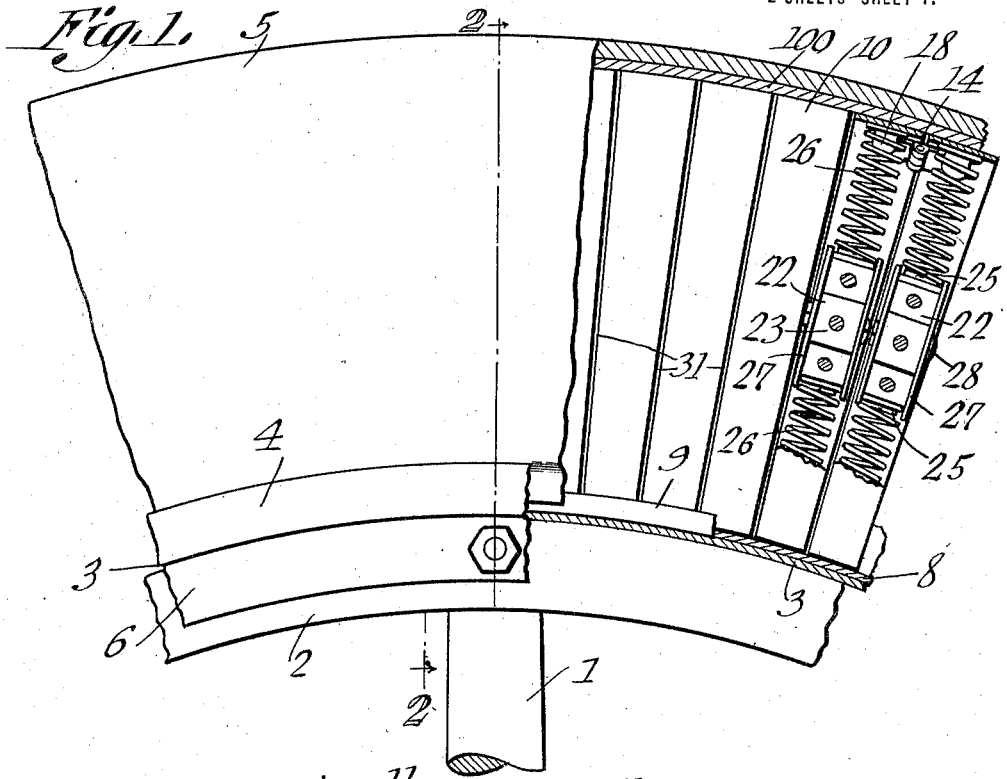
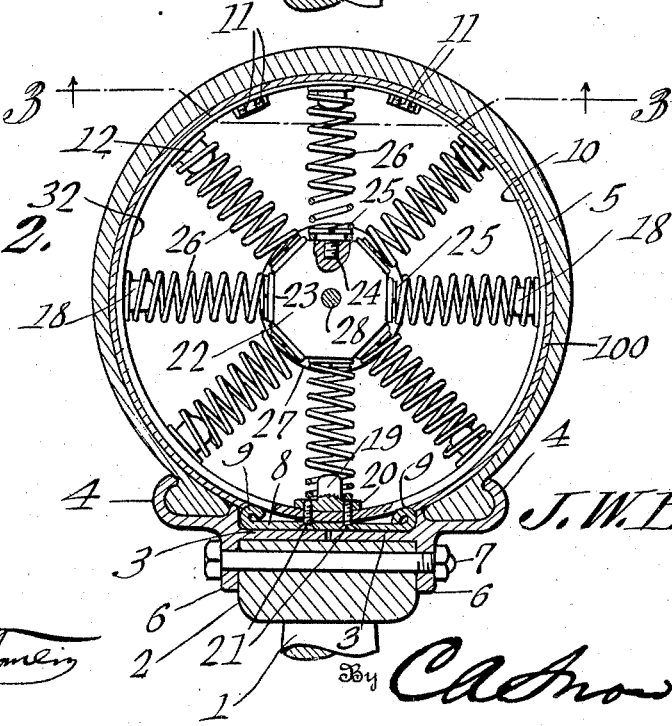
J. W. Bassham, Inventor

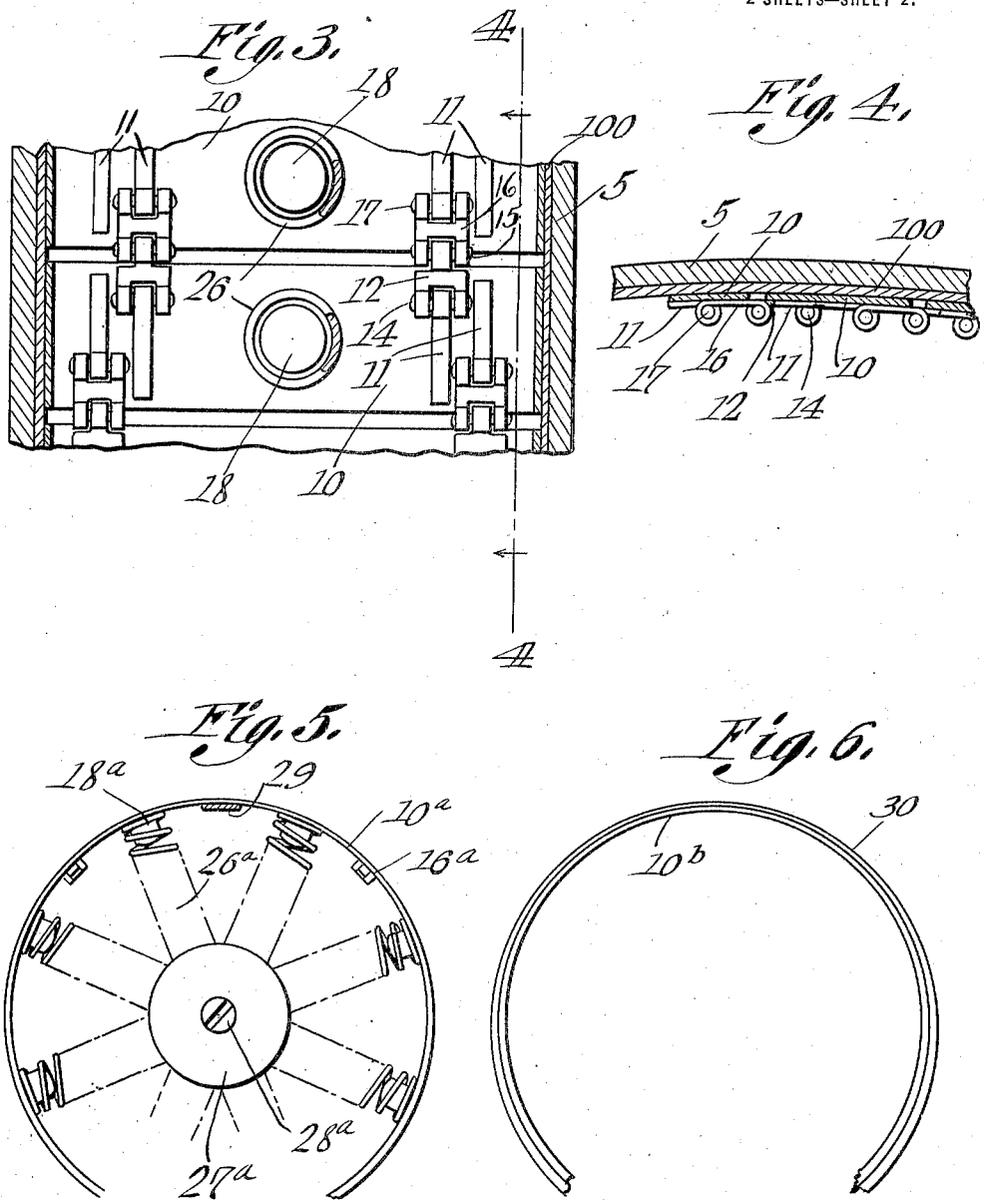

UNITED STATES PATENT OFFICE.

JOHN W. BASSHAM, OF COLUMBIA, TENNESSEE.

INNER TUBE.

1,312,072. Specification of Letters Patent. Patented Aug. 5, 1919.

Application filed June 20, 1918. Serial No. 241,009.

*To all whom it may concern:*

Be it known that I, JOHN W. BASSHAM, a citizen of the United States, residing at Columbia, in the county of Maury and State of Tennessee, have invented a new and useful Inner Tube, of which the following is a specification.

The device forming the subject matter of this application is adapted to replace a pneumatic inner tube in a vehicle tire, and constitutes to all intents and purposes, an inner tube.

One object of the invention is to provide means whereby inner tubes, which are subject to puncture and deterioration, may be dispensed with. Another object of the invention is to provide resilient rings adapted to be assembled with a circumferential base member, and reinforced internally by a novel arrangement of springs, the construction being such that any ring may be removed from the base member, and being such that any spring may be removed from its containing ring, to the end that damaged parts may be replaced readily.

I have not attempted to show all of the forms which my invention may take, and a skilled mechanic may work changes in those forms which I have delineated and described, without departing from the spirit of the invention, or jeopardizing the utility thereof.

In the drawings:—

Figure 1 shows in side elevation, a portion of a wheel and a tire wherein the invention has been embodied, parts being broken away and parts appearing in section; Fig. 2 is a cross section on the line 2—2 of Fig. 1; Fig. 3 is a section on the line 3—3 of Fig. 2; Fig. 4 is a section on the line 4—4 of Fig. 3; Fig. 5 is a transverse section showing a modified form of the invention, most parts appearing in elevation; Fig. 6 is an elevation showing a further modification.

In the accompanying drawings, the numeral 1 marks a spoke of a wheel, carrying a felly 2 which supports a rim. The rim may be made in various ways, so far as the invention is concerned, but in the present instance, the rim includes parts 3 extended transversely of the felly 2 and provided with any suitable means 4 for engaging a casing 5 which is constructed of rubber or any other flexible material employed commonly in the making of tire casings. The rim parts 3 may be supplied with side flanges 6 secured to the felly 2 by attaching devices 7.

A circumferential ring or base member 8 rests on the rim parts 3 and is retained against lateral movement thereby. If desired, the edges of the base member may be turned over to form stiffening beads 9. Resilient rings 10 are disposed transversely of the base member 8. The edges of each ring converge, as shown at 31, as they extend toward the base member 8, so that the edges of adjoining rings may be parallel, and to the end that there may be no objectionable gaps between the rings at the tread portion of the structure. In order to compensate for the weakening caused by converging the edges of the rings at 31, the rings are made thicker adjacent the base member 8 than they are in their tread portions, the rings tapering in thickness toward their tread portions, as shown at 32 in Fig. 2. The rings 10 fit closely within the casing 5 and serve as a support therefor, replacing an inflatable inner tube. The rings 10 carry brackets 11 located side by side, the bracket 11 on one ring being pivoted at 14 to a link 12 which is pivoted at 15 to a link 16, pivoted at 17 to the bracket 11 of an adjoining ring. The tread portions of the rings are, therefore, connected by hinges, as shown best in Fig. 3. Each ring 10 may yield radially, independently of the next ring, to some extent, but the rings are linked together, to resist the circumferential strain resulting from the tractive effort of the wheel.

Each ring 10 is provided upon its inner curve, with any desired number of inwardly projecting studs 18. That stud which is closest to the base member 8 is denoted by the numeral 19 and is provided with a flange 20. Securing devices 21, which may be screws, or bolts, pass through the base member 8 and through the rings 10, to hold the same on the base member. It is to be observed that the securing devices 21 engage the flange 20 of the inner stud 19, so that the base of this stud serves as a washer or retainer.

Disposed within each ring 10 is a core block 22 having any desired number of straight flat edges 23. Attaching members, such as screws 24, are assembled with the flat edges of the core blocks and include heads 25 retaining the inner convolutions of radial helical springs 26 in abutment with the flat edges 23 of the core blocks 22. If desired, the screws 24 may be omitted, since a means now to be described, is provided for engaging the inner ends of the springs 26 to hold those ends on the flat edges 23 of the blocks 22. Plates 27 abut against the opposite ends of each core block 22 and extend beyond the periphery of the block, to act as retainers for the inner ends of the springs and to hold them on the flat faces 23 as do the elements 24. A securing element, such as a bolt 28, passes through each core block 22 and holds the plates 27 thereon. The outer end of the springs 26 abut against the rings 10 and are held thereto by the studs 18 and 19.

The springs 26 resist compression of the rings 10, in a radial direction, and give the device great resiliency and load-supporting power. The plates 27 may be detached from the blocks 22, and any spring 26 which is broken or dead, may be replaced. Further, any ring 10, with all of its springs 26 may be removed, should occasion demand.

In the modification shown in Fig. 5, parts hereinbefore described have been designated by numerals previously used, with the suffix "a." The modification consists in extending a circumferential ring transversely of the rings 10, within the rings 10 and at the tread portions thereof, the ring, denoted by the numeral 29, being expansible and being held in position, within limits, by the studs 18ᵃ between which the ring is located.

If any ring, such as the ring 10ᵇ of Fig. 6, needs reinforcement, another ring 30 may be applied thereto.

If desired, a filler 100, made of any flexible material, may be placed between the casing 5 and the rings 10.

I claim:—

1. In a device of the class described, a circumferential base member; transverse resilient rings; means for securing the rings detachably to the base member; a core block in each ring; helical compression springs disposed radially of each ring, the outer ends of the springs abutting against the ring, and the inner ends of the springs abutting against the block; plates at the opposite ends of each block and projecting beyond the periphery thereof to act as retainers for the inner ends of the springs; and means for securing the plates detachably to the block.

2. In a device of the class described, a circumferential base member; transverse resilient rings; means for securing the rings detachably to the base member, a core block in each ring; helical compression springs disposed radially of each ring, the outer ends of the springs abutting against the ring, and the inner ends of the springs abutting against the block; plates at the opposite ends of each block and projecting beyond the periphery thereof to act as retainers for the inner ends of the springs; and a single securing element passing through each block and engaged at its ends with the plates of said block.

3. In a device of the class described, a circumferential base member; transverse resilient rings; means for securing the rings detachably to the base member; a core block in each ring; hinges uniting the edges of the rings; and helical compression springs disposed radially of each ring, the outer ends of the springs abutting against the ring and the inner ends of the springs abutting against the block.

4. In a device of the class described, a circumferential base member; transverse resilient rings; means for securing the rings detachably to the base member; a core block in each ring; hinges uniting the edges of the rings; helical compression springs disposed radially of each ring, the outer ends of the springs abutting against the ring, and the inner ends of the springs abutting against the block; plates at the opposite ends of each block and projecting beyond the periphery thereof to act as retainers for the inner ends of the springs; and a securing element passing through each block and engaged at its ends with the plates of said block.

In testimony that I claim the foregoing as my own, I have hereto affixed my signature in the presence of two witnesses.

JOHN W. BASSHAM.

Witnesses:
 F. L. LEARCH,
 I. E. SIMPSON.

Copies of this patent may be obtained for five cents each, by addressing the "Commissioner of Patents, Washington, D. C."